(12) United States Patent
He et al.

(10) Patent No.: US 9,712,302 B2
(45) Date of Patent: *Jul. 18, 2017

(54) FRAME STRUCTURE DESIGN FOR NEW CARRIER TYPE (NCT)

(71) Applicant: Intel Corporation, Santa Clara, CA (US)

(72) Inventors: Hong He, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,550

(22) Filed: May 29, 2015

(65) Prior Publication Data

US 2015/0263839 A1 Sep. 17, 2015

Related U.S. Application Data

(63) Continuation of application No. 13/628,129, filed on Sep. 27, 2012, now Pat. No. 9,078,109.
(Continued)

(51) Int. Cl.
*H04L 5/00* (2006.01)
*H04W 4/00* (2009.01)
(Continued)

(52) U.S. Cl.
CPC .......... *H04L 5/0048* (2013.01); *H04L 5/0051* (2013.01); *H04L 27/2657* (2013.01);
(Continued)

(58) Field of Classification Search
CPC ........... H04L 27/2657; H04L 27/2655; H04W 72/0446; H04W 72/1263
See application file for complete search history.

(56) References Cited

U.S. PATENT DOCUMENTS 8,228,862 B2    7/2012   Nam et al.
8,340,199 B2   12/2012   Nam et al.
(Continued)

FOREIGN PATENT DOCUMENTS

CN         102246581 A    11/2011
WO    2013155071 A1    10/2013

OTHER PUBLICATIONS

European Search Report received for European Patent Application No. 13774958.6, mailed on Jul. 15, 2015, 8 pages.
(Continued)

*Primary Examiner* — Redentor Pasia
(74) *Attorney, Agent, or Firm* — Alpine Technology Law Group LLC

(57) ABSTRACT

A system and method utilizes a selected PRB configuration for a new carrier type for a 3GPP-type wireless network. A downlink signal is received that comprises a demodulation reference signal pattern in at least one predetermined subframe of the downlink signal. The subframe comprises a first predetermined number of the plurality of orthogonal frequency division multiplex (OFDM) symbols comprising synchronization signals for a legacy version of the downlink signal and the demodulation reference signal pattern comprising a second predetermined number of OFDM symbols that are different from the first predetermined number of the plurality of OFDM symbols. After receiving the downlink signal, the demodulation reference signal pattern in the downlink signal is demodulated.

18 Claims, 15 Drawing Sheets

Related U.S. Application Data

(60) Provisional application No. 61/621,939, filed on Apr. 9, 2012.

(51) Int. Cl.

| | | |
|---|---|---|
| *H04W 76/02* | (2009.01) |
| *H04W 48/18* | (2009.01) |
| *H04W 8/06* | (2009.01) |
| *H04L 29/06* | (2006.01) |
| *H04L 12/58* | (2006.01) |
| *H04W 60/04* | (2009.01) |
| *H04W 4/14* | (2009.01) |
| *H04L 27/26* | (2006.01) |
| *H04N 21/442* | (2011.01) |
| *H04N 21/643* | (2011.01) |

(52) U.S. Cl.
CPC .......... *H04L 51/38* (2013.01); *H04L 65/4092* (2013.01); *H04N 21/44209* (2013.01); *H04N 21/643* (2013.01); *H04W 4/001* (2013.01); *H04W 4/14* (2013.01); *H04W 8/06* (2013.01); *H04W 48/18* (2013.01); *H04W 60/04* (2013.01); *H04W 76/026* (2013.01)

(56) References Cited

U.S. PATENT DOCUMENTS

| | | | |
|---|---|---|---|
| 8,369,206 | B2 | 2/2013 | Nam et al. |
| 8,489,029 | B2 | 7/2013 | Siomina et al. |
| 8,582,516 | B2 | 11/2013 | Chen et al. |
| 2008/0310396 | A1* | 12/2008 | Park ................ H04W 56/0045 370/350 |
| 2010/0104034 | A1* | 4/2010 | Nam .................. H04L 5/0007 375/260 |
| 2011/0111781 | A1 | 5/2011 | Chen et al. |
| 2011/0216842 | A1* | 9/2011 | Zhang ................ H04L 5/0051 375/260 |
| 2011/0249767 | A1* | 10/2011 | Chen .................. H04L 5/0051 375/295 |
| 2011/0319025 | A1 | 12/2011 | Siomina et al. |
| 2013/0215823 | A1 | 8/2013 | Shin et al. |
| 2013/0229953 | A1* | 9/2013 | Nam ................. H04W 72/0426 370/280 |
| 2016/0353444 | A1 | 12/2016 | Popovic et al. |

OTHER PUBLICATIONS

Samsung, "Synchronization signal mapping for the new carrier type", Mar. 26-30, 2012, 3 pages, 3rd Generation Partnership Project, Jeju, Korea.

Apple Inc., "On the Configuration and Usage of New Carrier Types", Feb. 6-10, 2012, 6 pages, 3rd Generation Partnership Project, Dresden, Germany.

Intel Corporation, "Discussion on Reference Symbol Design for New Carrier Types", Mar. 26-30, 2012, 5 pages, 3rd Generation Partnership Project, Jeju Island, Korea.

International Preliminary Report on Patentability received for International Application No. PCT/US2013/035772, mailed on Oct. 23, 2014.

HTC, "Synchronization Signals and Procedures for Unsynchronised New Carriers", R1-121407, 3GPP TSG RAN WGI Meeting #68bis, Jeju, Korea, Mar. 26, 2012, 3 pages.

International Search Report and Written opinion for PCT Patent ApplicationNo. PCT/US2013/035772, mailed on Jul. 29, 2013, 10 pages.

Qualcomm Inc., "PSS/SSS for New Carriers", R1-121549, 3GPP TSG RAN WGI Meeting #68bis, Jeju, Korea, Mar. 26, 2012, 2 pages.

Samsung, et al., "WF on Synchronization signal mapping for NCT", R1-121807 3GPP TSG RAN WGI Meeting #68bis, Jeju, Korea, Mar. 26, 2012, 2 pages.

ZTE, RS for Synchronization on Additional Carrier Types, R1-121065 3GPP TSG RAN WGI Meeting #68bis, Jeju, Korea, Mar. 26, 2012, 4 pages.

Katumba, et al., "The LTE Access Procedure, White Paper Department of Computer Science and Engineering and Department of Signals and Systems", Chalmers University of Technology, Gothenburg, Sweeden, Apr. 25, 2013, 6 pages.

Office Action received for Chinese Patent Application No. 201380017298.0, mailed on Dec. 28, 2016, 9 pages.

\* cited by examiner

FRAME STRUCTURE DESIGN FOR NEW CARRIER TYPE (NCT)

CROSS-REFERENCE TO RELATED APPLICATIONS

The present patent application is a continuation of U.S. application Ser. No. 13/628,129 filed Sep. 27, 2012, pending, which in turn claims the benefit of U.S. Provisional Patent Application Ser. No. 61/621,939 filed Apr. 9, 2012. Said application Ser. No. 13/628,129 and said Application No. 61/621,939 are hereby incorporated by reference herein in their entireties.

TECHNICAL FIELD

Embodiments described herein are generally directed to the field of wireless communications.

BACKGROUND

An additional carrier type has been extensively discussed for the Radio Layer 1 (RAN1) of the $3^{rd}$ Generation Partnership Project (3GPP) collaboration between various telecommunications associations. From the perspective of RAN1, the main motivations for introducing a New Carrier Type (NCT) for carrier aggregation include enhanced spectral efficiency, improved support for heterogeneous network, and energy efficiency.

The baseline approach for the Primary Synchronization Signal (PSS) and Secondary Synchronization Signal (SSS) mapping for the NCT is as per Release 8 (Rel-8) of the 3GPP Mobile Broadband Standard. That is, the PSS/SSS signals for the NCT are mapped onto the last and the next to last Orthogonal Frequency Division Multiplexing (OFDM) symbols in the center six Physical Resource Blocks (PRBs) of the system bandwidth in the first slot of subframes 0 and 5 according to the 3GPP TS 36.211. While the baseline approach is simplest in terms of specification impact and UE implementation, a Demodulation Reference Signal (DMRS) (also referred to as a User Equipment-Specific Reference Signal for Demodulation (UE-RS)) and PSS/SSS collision issue will occur, as illustrated in FIGS. 1A and 1B. FIG. 1A depicts a Physical Resource Block (PRB) for a Frequency-Division Duplexing (FDD) system, and FIG. 1B depicts a PRB for a Time-Division Duplexing (TDD) system. A collision occurs when the PSS/SSS signals overlap with the DMRS signals, as depicted by boxed Resource Elements (REs) in the PRBs.

Release 10 (Rel-10) of the 3GPP Standard does not allow UE-RS-based transmission schemes in the center six PRBs in subframes 0 and 5 in which PSS/SSS signals are transmitted because the UE-RS signal mapping collides with the legacy PSS/SSS signal mapping at symbols 5 and 6. In other words, demodulation of Rel-10 uses Cell Specific Reference Signal (CRS) based transmission modes if such collisions occur and the US-RS is not used. In Release 11 (Rel-11) of the 3GPP Standard, the New Carrier Type (NCT) can carry one Reference Signal (RS) port (consisting of the Rel-8 CRS Port 0 Resource Elements (REs) per PRB and the Rel-8 sequence) within one subframe with 5 ms periodicity and this RS port (based on Rel-8 CRS port) is not used for demodulation.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1A:
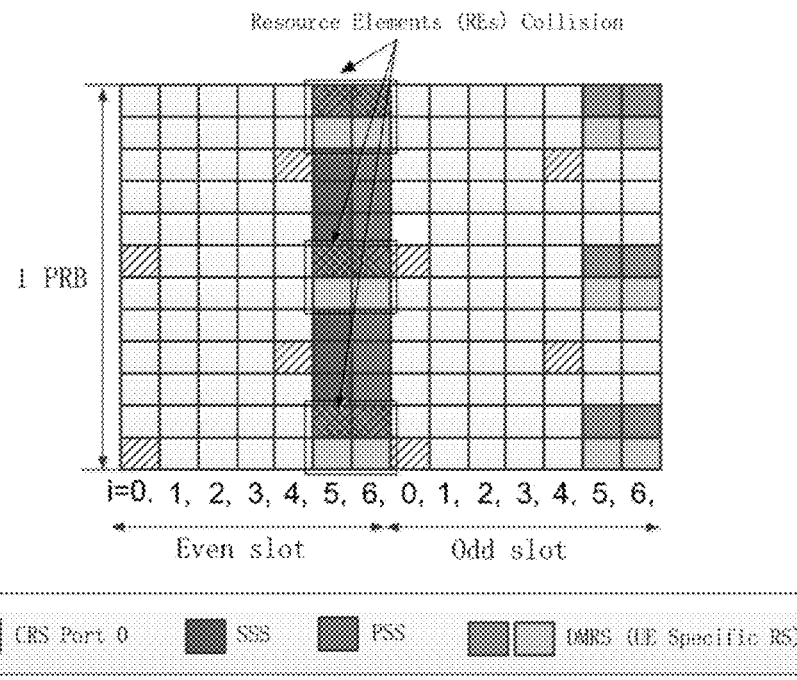
FIGS. 1A and 1B respectively depict baseline approaches for a Physical Resource Block (PRB) for a Frequency-Division Duplexing (FDD) system, and a PRB for a Time-Division Duplexing (TDD) system.
Figure 1B:
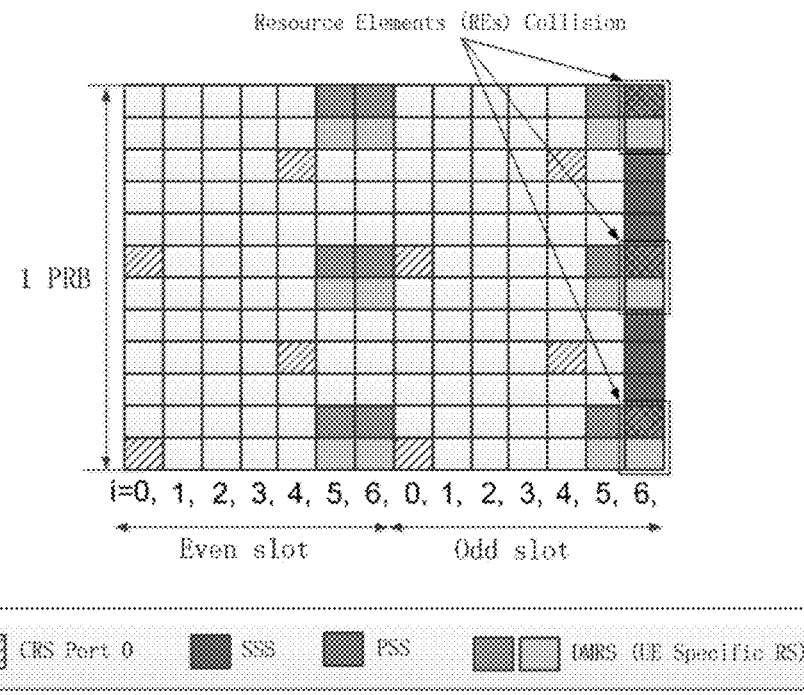

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments of techniques and devices described herein relate to wireless communications. In particular, the subject matter disclosed herein relates to configurations of Physical Resource Blocks (PRBs) that permit demodulation of Physical Downlink Shared Channel (PDSCH) transmitted in the center six PRBs if the Release 8 (Rel-8) of the 3GPP Standard Primary Synchronization Signal and Secondary Synchronization Signal (PSS/SSS) mapping (i.e., a legacy PSS/SSS mapping) is used for a New Carrier Type (NCT). The configurations provided by the subject matter disclosed herein avoid collision with Resource Elements (REs) for legacy UE-Specific RS transmission. In one or more embodiments, the term legacy may refer to a currently existing or previously existing standard, including any release, version or implementation thereof, and/or or any device, system, network, or method capable of operating in accordance therewith, although the scope of the claimed subject matter is not limited in this respect.

In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein relates to configurations of Physical Resource Blocks (PRBs) that permit demodulation of Physical Downlink Shared Channel (PDSCH) transmitted in the center six PRBs if the Release 8 (Rel-8) of the 3GPP Standard Primary Synchronization Signal and Secondary Synchronization Signal (PSS/SSS) mapping (i.e., a legacy PSS/SSS mapping or legacy synchronization pattern) is used for a New Carrier Type (NCT). The configurations provided by the subject matter disclosed herein avoid collision with Resource Elements (REs) for legacy UE-Specific RS transmission.

In one exemplary embodiment of the subject matter disclosed herein, a Demodulation Reference Signal (DMRS) (also referred to as a UE-RS) pattern is used in PRBs with collision. Alternatively, the DMRS pattern is applied to all PRBs with the same slot or subframe. In another exemplary embodiment, the PSS/SSS location in subframes 0 and 5 is selected to avoid collisions. Commonality between TDD and FDD systems is achieved for the DMRS pattern and/or the PSS/SSS locations, and the collision issue is avoided between UE-RS and PSS/SSS with no degradation on PDSCH performance.

Figure 2:
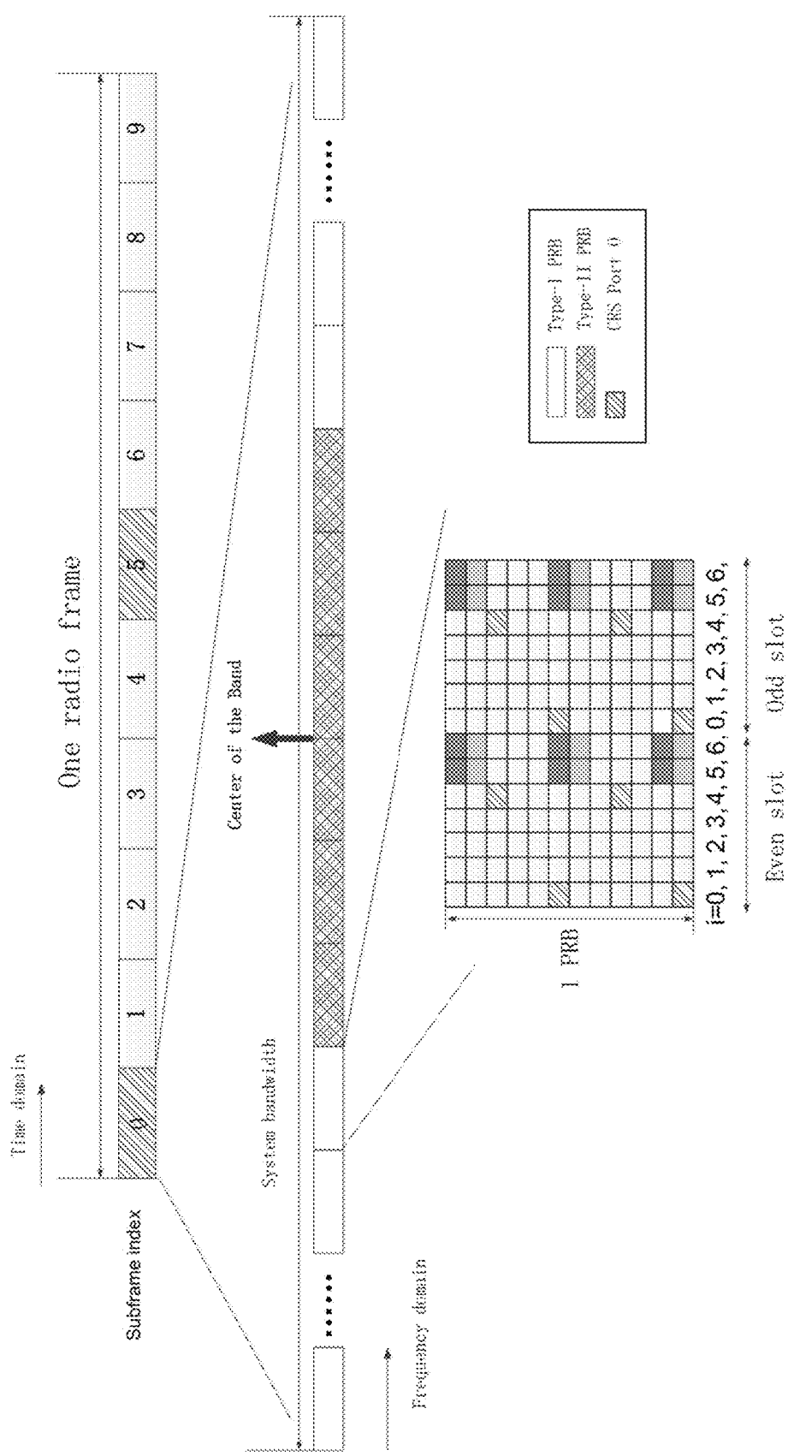
FIG. 2 depicts an exemplary frame structure of a radio frame for a RAN1 according to the subject matter disclosed herein.

FIG. 2 depicts an exemplary frame structure of a radio frame for a RAN1 according to the subject matter disclosed herein. In particular, FIG. 2 depicts two types of PRBs occur in subframes 0 and 5, referred to herein as Type-I PRBs and Type-II PRBs. Type-I PRBs are PRBs with no RS-PSS/SS collisions and Type-II PRBs are PRBs with RS-PSS/SS collisions. The Type-II PRBs are the six central PRBs shown in FIG. 2. According to the subject matter disclosed herein, for PRBs in subframes 0 and 5 a DMRS pattern is used for UE-specific reference signals for a normal cyclic prefix to avoid a RS-PSS/SSS collision. Such a new DMRS can be used for a slot, or subframe, or can be dependent on the frequency location of the PRB (e.g., applied to only the Type-II PRBs). One exemplary embodiment provides a new DMRS pattern in the central six PRBs of bandwidth (Type-II PRBs in FIG. 2) and uses a legacy DMRS pattern for other PRBs in the same subframe.

Figure 3A:
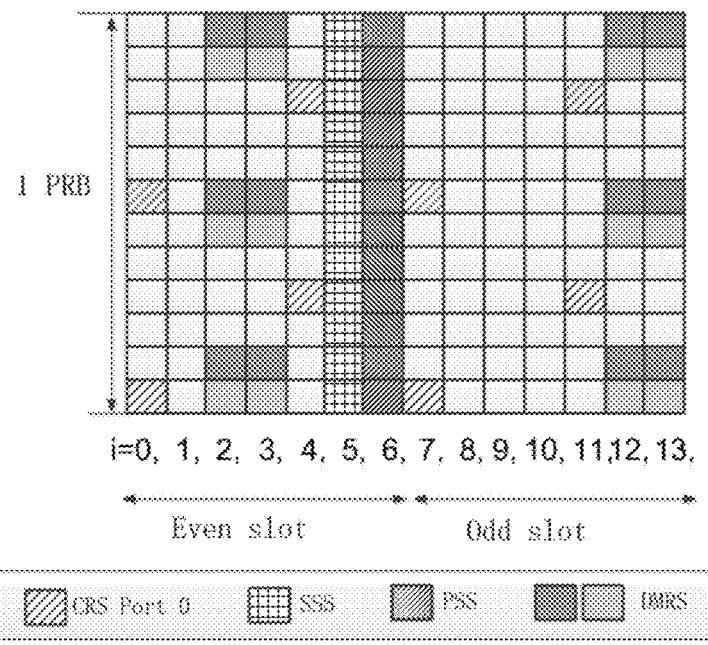
FIGS. 3A-3I depict different PRB configuration according to the subject matter disclosed herein.
Figure 3B:
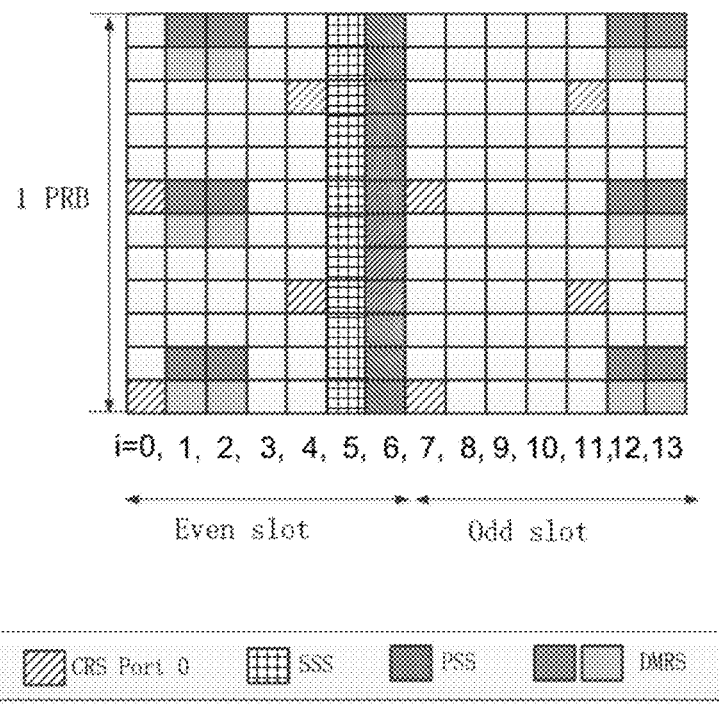

According to the subject matter disclosed herein, UE-RS (i.e., DMRS) patterns are selected to be on non-CRS OFDM symbols to avoid the common reference signal (CRS) port 0, PSS/SSS signals, PBCH and CSI-RS of a legacy system. Therefore, for a normal Cyclic Prefix (CP) configuration, one exemplary embodiment provides that UE-RS are placed in OFDM symbols 2-3 and 12-13 in Type-II PRBs, as shown in FIG. 3A. In another exemplary embodiment, UE-RS are placed in OFDM symbols 1-2 and 12-13 in Type-II PRBs, as shown in FIG. 3B.

Figure 3C:
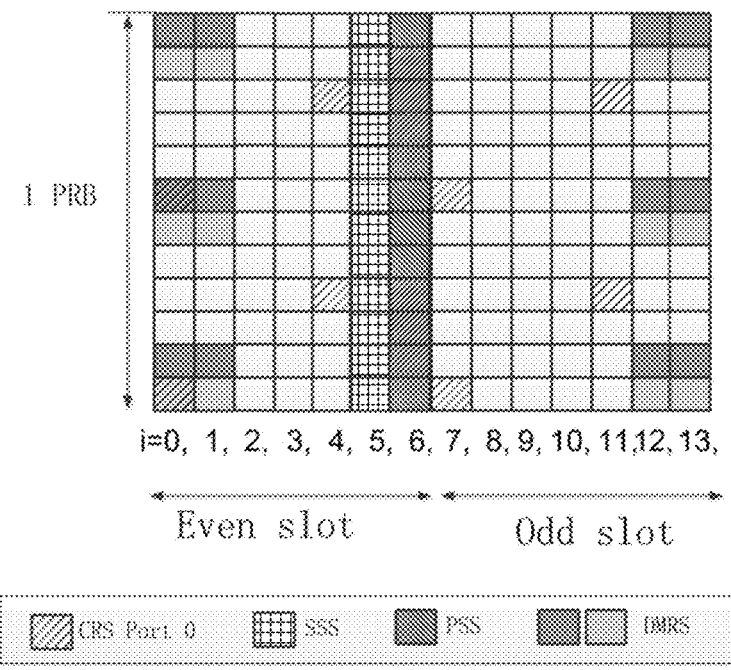

Channel estimation performance of UE-RS patterns can be significantly impacted by the location of the Reference Signal (RS). Generally, placement of the RS on the edges or near the edge OFDM symbols in each slot provides the best performance for the range of low speeds (3 km/h or 30 km/h) or for the high speeds (120 km/h) over which Rel-10 of the 3GPP Mobile Broadband Standard needs to be optimized. FIG. 3C shows one exemplary embodiment of the subject matter disclosed herein in which the UE-RS patterns are placed in OFDM symbols 0-1 and 12-13 for Type-II PRBs. The REs for CRS port 0 are punctured by DMRS REs if collision occurs, that is, a UE may assume that CRS port 0 are not present in a collision REs, as shown in FIG. 3C.

Figure 3D:
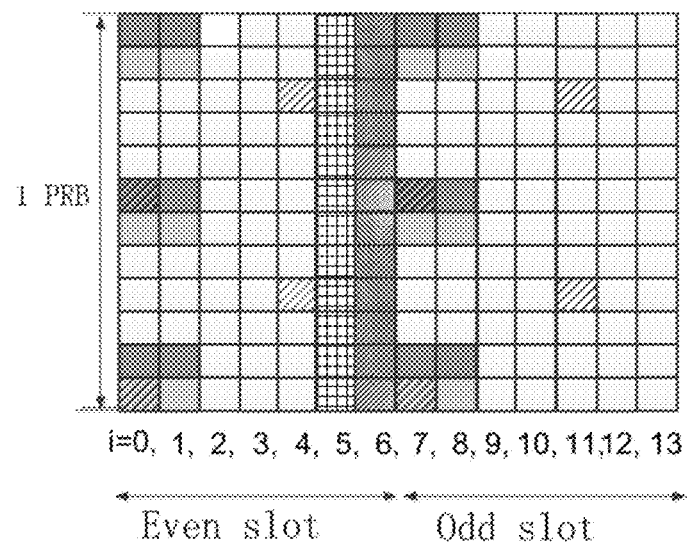

In another exemplary embodiment of the subject matter disclosed herein shown in FIG. 3D, the UE-RS patterns are selected for Type-II PRBs to be a "mirror" of a legacy DMRS pattern in each slot considering the legacy PDCCH is not transmitted in NCT. With this mirror configuration, the exemplary embodiment of FIG. 3D provides much better demodulation performance than the exemplary embodiments of FIGS. 3A-3C for higher-speeds scenarios while still avoiding collision with legacy PSS/SSS in both FDD and TDD systems. Therefore, the exemplary embodiment of FIG. 3D provides a UE-RS configuration that maximizes DMRS pattern commonality between FDD and TDD systems. Moreover, the exemplary embodiment of FIG. 3D could also be used at Type-1 PRBs to reduce UE complexity by using the same DMRS design for both Type-I and Type-II PRBs in one subframe, thereby avoiding the need of implementing two UE-RS channel estimators.

Figure 3E:
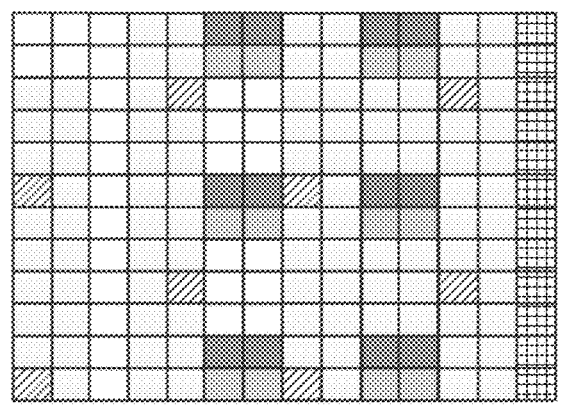
Figure 3E:
Figure 3F:
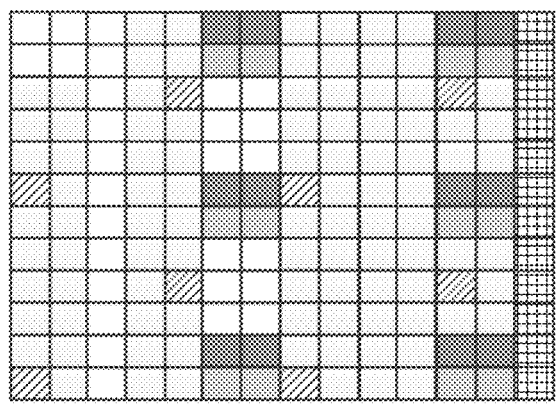
Figure 3F:

For a TDD-based system, the subject matter disclosed herein provides two additional DMRS patterns that are based on principles similar to those described above. The exemplary embodiment of the subject matter disclosed herein that is shown in FIG. 3E does not cause extra UE complexity by needing an additional UE-RS channel estimator because the configuration of this exemplary embodiment corresponds to a legacy DMRS pattern that has been specially designed for the Downlink Pilot Time Slot (DwPTS) of existing TDD UEs. Accordingly, the exemplary embodiment of FIG. 3E provides a hybrid DMRS pattern for normal subframes 0 and 5. That is, the DRMS pattern of the exemplary embodiment of FIG. 3E is a hybrid because it includes a legacy pattern and a pattern according to the subject matter disclosed herein. In FIG. 3F, the exemplary embodiment depicted shifts a legacy DMRS pattern by one OFDM symbol to avoid the collision with SSS sequence in TDD system.

Figure 3G:
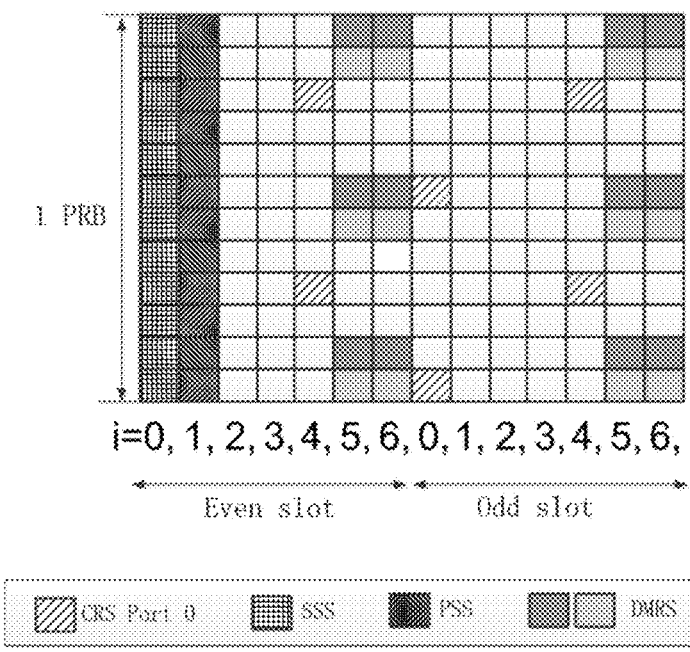
Figure 3H:
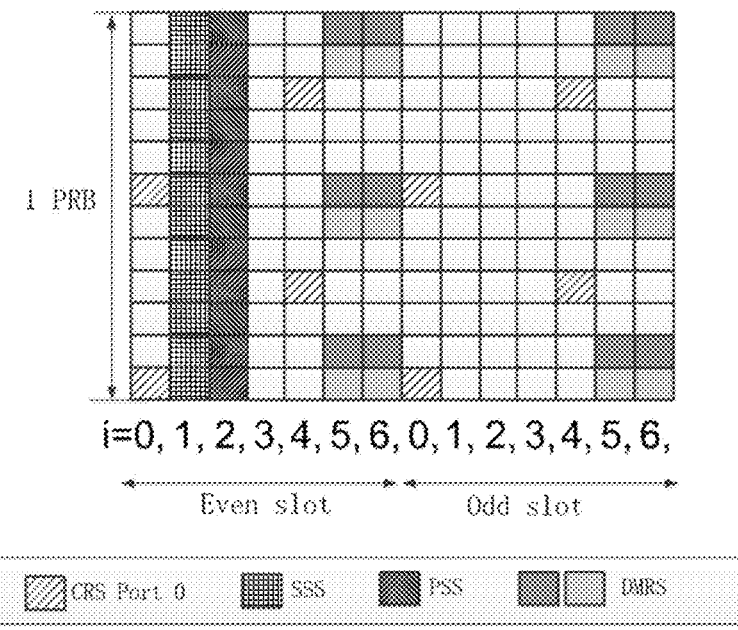
Figure 3I:
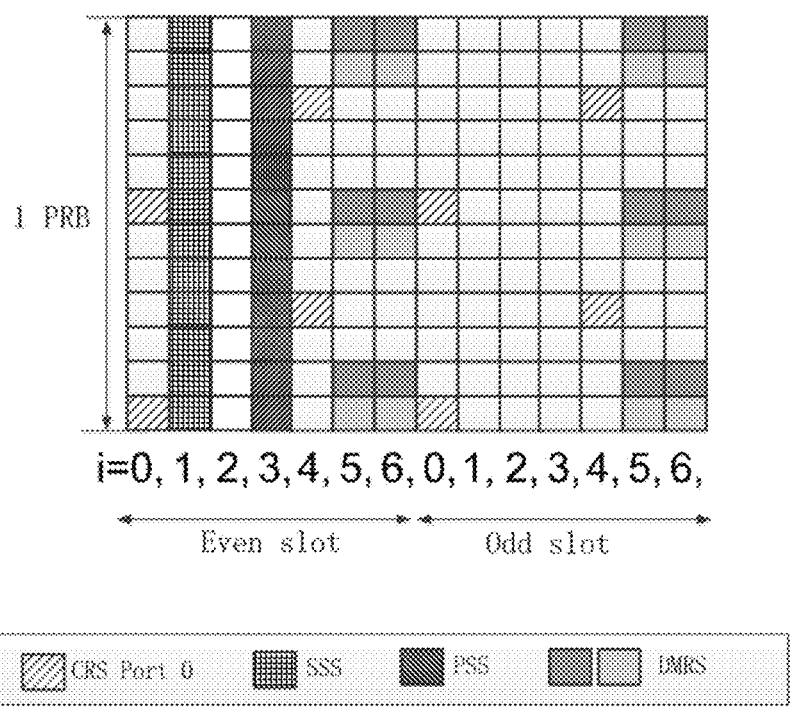

FIGS. 3G-3I respectively depict additional exemplary embodiments of the subject matter disclosed herein. In FIGS. 3G and 3H, the PSS/SSS symbols are respectively remapped on the first or second two consecutive OFDM symbols within a subframe. In FIG. 3I, the PSS/SSS symbols are remapped into the second and fourth OFDM symbols within a subframe. These three exemplary embodiments provide coherent detection of the SSS using the PSS, thereby providing better detection performance over a nonconsecutive OFDM-symbol configuration. Additionally, the exemplary configurations of FIGS. 3G-3I avoid collisions with legacy DMRS, PBCH and CSI-RS, while achieving PSS/SSS commonality between TDD and FDD system.

Figure 4:
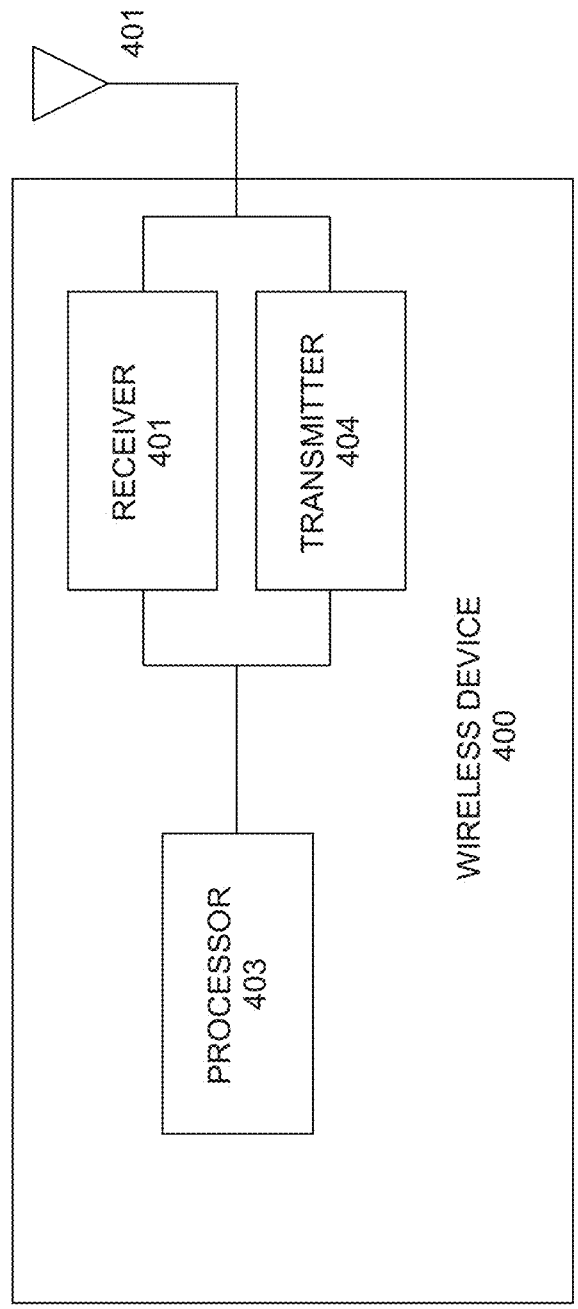
FIG. 4 depicts a functional block diagram of an exemplary embodiment of a wireless station WD 400 according to the subject matter disclosed herein.

FIG. 4 depicts a functional block diagram of an exemplary embodiment of a wireless station WD 400 according to the subject matter disclosed herein. Wireless device 400 comprises at least one antenna 401 and a receiver 402 coupled in a well-known manner to antenna 401. In one exemplary embodiment, wireless device 400 also comprises a processor 403 and a transmitter 404.

Antenna 401 receives a downlink signal from a wireless network, such as a 3GPP-based network utilizing a New Carrier Type (NCT). The downlink signal comprises a demodulation reference signal pattern in at least one predetermined subframe of the downlink signal, such as depicted in FIG. 2. The at least one subframe comprises a first predetermined number of the plurality of orthogonal frequency division multiplex (OFDM) symbols comprising synchronization signals for a legacy version of the downlink signal, such as the 3GPP PSS/SSS mapped into the New Carrier Type (NCT). According to the subject matter disclosed herein, the demodulation reference signal pattern comprises a second predetermined number of OFDM symbols that are different from the first predetermined number of the plurality of OFDM symbols. Receiver 402 demodulates the demodulation reference signal pattern in the downlink signal in a well-known manner.

In one exemplary embodiment, wireless device 400 comprises, but is not limited to, a cellular telephone, smartphone, smart-type device, or tablet-type device. In another exemplary embodiment, wireless device comprising a touch-screen display capable of receiving input information from a touch of a user or a stylus, such as disclosed herein in connection with FIGS. 10 and 11.

Figure 5:
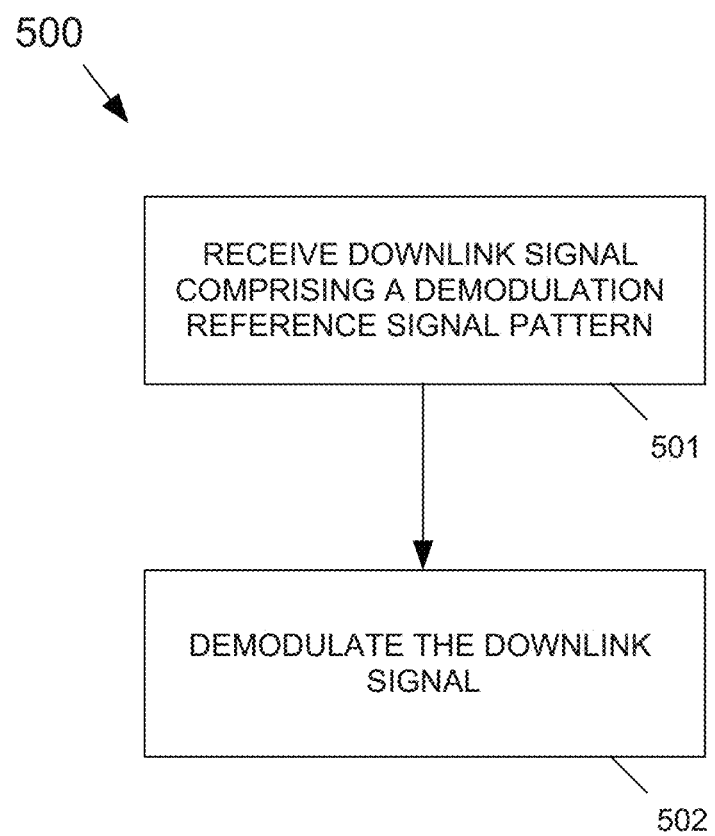
FIG. 5 depicts a flow diagram for demodulating a demodulation reference signal pattern according to the subject matter disclosed herein.

FIG. 5 depicts a flow diagram 500 for demodulating a demodulation reference signal pattern according to the subject matter disclosed herein. At 501, a downlink signal is received, such that the downlink signal comprises a demodulation reference signal pattern in at least one predetermined subframe of the downlink signal. At least one subframe of the downlink signal comprises a first predetermined number of the plurality of orthogonal frequency division multiplex (OFDM) symbols comprising synchronization signals for a legacy version of the downlink signal. The demodulation reference signal pattern comprises a second predetermined number of OFDM symbols that are different from the first predetermined number of the plurality of OFDM symbols. At 502, the demodulation reference signal pattern in the downlink signal is demodulated in a well-known manner.

In one exemplary embodiment, the at least one subframe of the downlink signal comprises a plurality of physical resource blocks (PRBs), such that each PRB comprises a selected portion of a frequency bandwidth of the at least one subframe and comprising a predetermined number of OFDM symbols. For this exemplary embodiment, the demodulation reference signal pattern of a PRB is based on a bandwidth position of a PRB in the at least one subframe, such as described in connection with Type-I and Type-II PRBs.

In another exemplary embodiment, at least one PRB of the at least one subframe comprises OFDM symbols respectively identified as OFDM symbols 0-13, and the demodulation reference signal pattern comprises OFDM symbols 0-1 and 7-8 of the PRB, such as depicted in FIG. 3D.

In another exemplary embodiment, the demodulation reference signal pattern comprises a first OFDM symbol pattern for a first plurality of physical resource blocks of the at least one subframe and a second OFDM symbol pattern for a second plurality of physical resource blocks of the at least one subframe, such that the second plurality of physical resource blocks comprises a predetermined number of physical resource blocks adjacent to a center frequency of the at least one subframe. In yet another exemplary embodiment, the demodulation reference signal pattern comprises OFDM symbols 2-3 and 12-13 of the PRB, such as depicted in FIG. 3A. In another exemplary embodiment, the demodulation reference signal pattern comprises OFDM symbols 1-2 and 12-13 of the PRB, such as depicted in FIG. 3B. In still another exemplary embodiment, the demodulation reference signal pattern comprises OFDM symbols 0-1 and 12-13 of the PRB, such as depicted in FIG. 3C. In other exemplary embodiments, the demodulation reference signal pattern comprises OFDM symbols 5-6 and 9-10 of the PRB (FIG. 3E), OFDM symbols 5-6 and 12-13 of the PRB (FIG. 3F). Still other exemplary embodiments are depicted in FIGS. 3G-3I.

Figure 6:
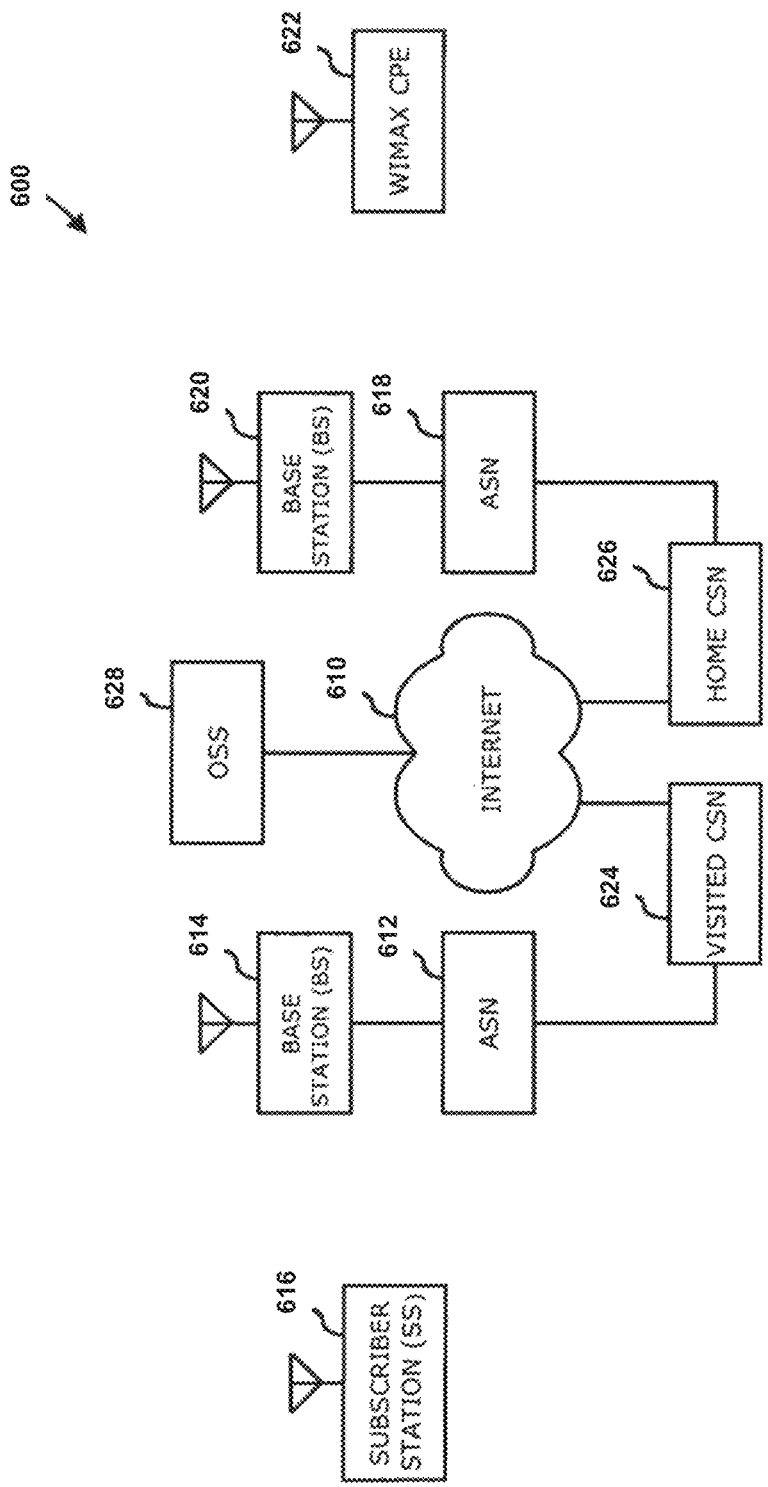
FIG. 6 depicts a block diagram of an exemplary configuration of a wireless network in accordance with one or more exemplary embodiments disclosed herein.

FIG. 6 depicts a block diagram of an exemplary configuration of a wireless network 600 in accordance with one or more exemplary embodiments disclosed herein. One or more of the elements of wireless network 600 may be capable of utilizing a PRB configuration according to the subject matter disclosed herein. As shown in FIG. 6, network 600 may be an Internet-Protocol-type (IP-type) network comprising an Internet-type network 610, or the like, that is capable of supporting mobile wireless access and/or fixed wireless access to Internet 610. In one or more exemplary embodiments, network 600 may be in compliance with a Worldwide Interoperability for Microwave Access (WiMAX) standard or future generations of WiMAX, and in one particular embodiment may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative exemplary embodiments, network 600 may be in compliance with a Third Generation Partnership Project Long Term Evolution (3GPP LTE), a 3GPP2 Air Interface Evolution (3GPP2 AIE) standard and/or a 3GPP LTE-Advanced standard. In general, network 600 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects. As an example of mobile wireless access, access service network (ASN)

612 is capable of coupling with base station (BS) 614 to provide wireless communication between subscriber station (SS) 616 (also referred to herein as a wireless terminal) and Internet 610. In one exemplary embodiment, subscriber station 616 may comprise a mobile-type device or information-handling system capable of wirelessly communicating via network 600, for example, a notebook-type computer, a cellular telephone, a personal digital assistant, an M2M-type device, or the like. In another exemplary embodiment, subscriber station is capable of utilizing a PRB configuration according to the subject matter disclosed herein. ASN 612 may implement profiles that are capable of defining the mapping of network functions to one or more physical entities on network 600. Base station 614 may comprise radio equipment to provide radio-frequency (RF) communication with subscriber station 616, and may comprise, for example, the physical layer (PHY) and media access control (MAC) layer equipment in compliance with an IEEE 802.16e-type standard. Base station 614 may further comprise an IP backplane to couple to Internet 610 via ASN 612, although the scope of the claimed subject matter is not limited in these respects.

Network 600 may further comprise a visited connectivity service network (CSN) 624 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 626, and the scope of the claimed subject matter is not limited in these respects. Visited CSN 624 may be referred to as a visited CSN in the case, for example, in which visited CSN 624 is not part of the regular service provider of subscriber station 616, for example, in which subscriber station 616 is roaming away from its home CSN, such as home CSN 626, or, for example, in which network 600 is part of the regular service provider of subscriber station, but in which network 600 may be in another location or state that is not the main or home location of subscriber station 616. In a fixed wireless arrangement, WiMAX-type customer premises equipment (CPE) 622 may be located in a home or business to provide home or business customer broadband access to Internet 610 via base station 620, ASN 618, and home CSN 626 in a manner similar to access by subscriber station 616 via base station 614, ASN 612, and visited CSN 624, a difference being that WiMAX CPE 622 is generally disposed in a stationary location, although it may be moved to different locations as needed, whereas subscriber station may be utilized at one or more locations if subscriber station 616 is within range of base station 614 for example. It should be noted that CPE 622 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 622 is capable of utilizing a PRB configuration according to the subject matter disclosed herein. In accordance with one or more embodiments, operation support system (OSS) 628 may be part of network 600 to provide management functions for network 600 and to provide interfaces between functional entities of network 600. Network 600 of FIG. 6 is merely one type of wireless network showing a certain number of the components of network 600; however, the scope of the claimed subject matter is not limited in these respects.

Figure 7:
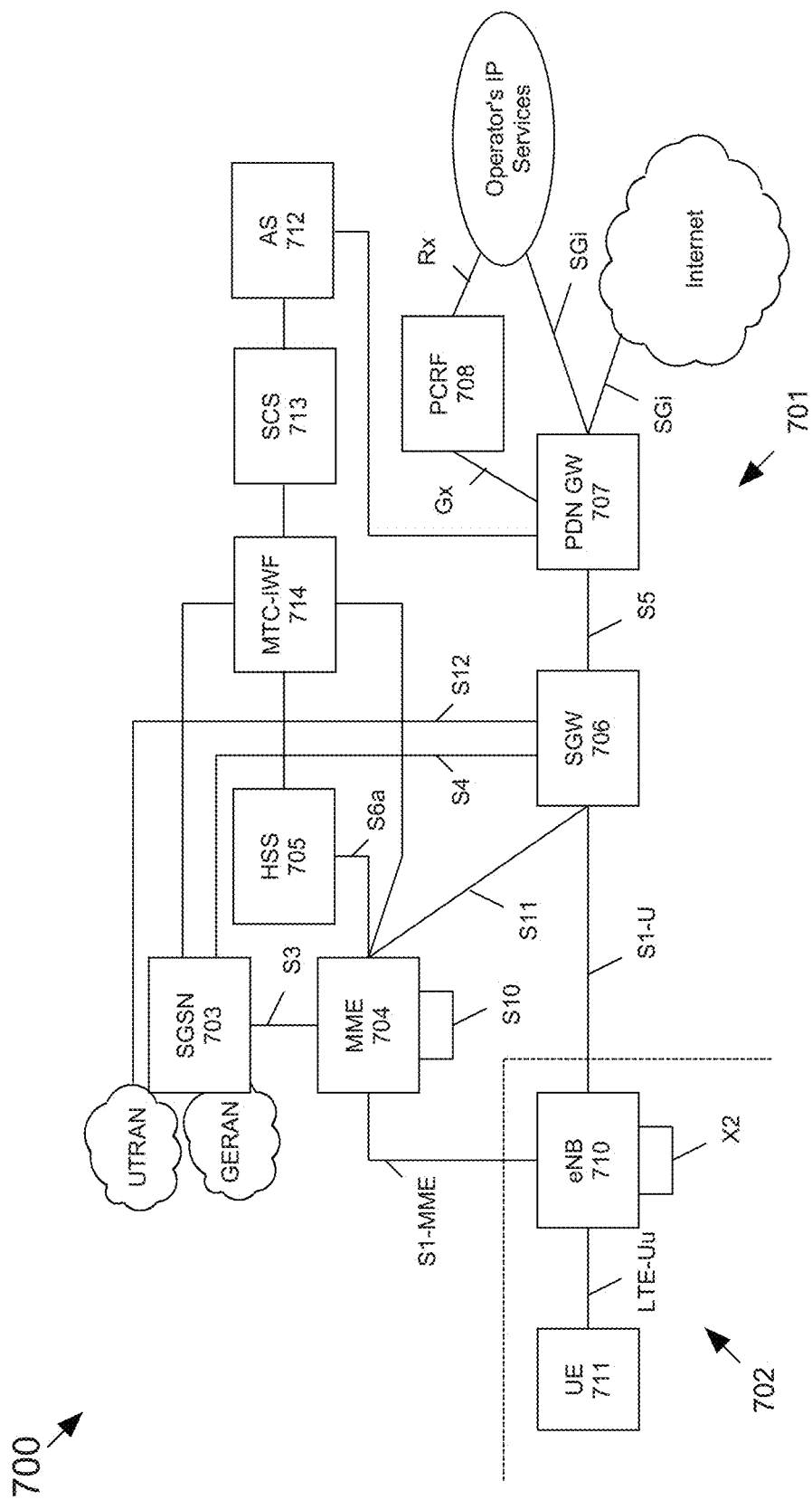
FIG. 7 shows an exemplary block diagram of the overall architecture of a 3GPP LTE network that includes one or more devices that are capable of utilizing a PRB configuration according to the subject matter disclosed herein.

FIG. 7 shows an exemplary block diagram of the overall architecture of a 3GPP LTE network 700 that includes one or more devices that are capable of utilizing a PRB configuration according to the subject matter disclosed herein. FIG. 7 also generally shows exemplary network elements and exemplary standardized interfaces. At a high level, network 700 comprises a core network (CN) 701 (also referred to as an evolved Packet System (EPC)), and an air-interface access network E-UTRAN 702. CN 701 is responsible for the overall control of the various User Equipment (UE) connected to the network and establishment of the bearers. CN 701 may include functional entities, such as a home agent HA and/or an ANDSF server or entity, although not explicitly depicted. E-UTRAN 702 is responsible for all radio-related functions.

The main exemplary logical nodes of CN 701 include, but are not limited to, a Serving GPRS Support Node 703, the Mobility Management Entity 704, a Home Subscriber Server (HSS) 705, a Serving Gate (SGW) 706, a PDN Gateway 707 and a Policy and Charging Rules Function (PCRF) Manager 708. The functionality of each of the network elements of CN 701 is well known and is not described herein. Each of the network elements of CN 701 are interconnected by well-known exemplary standardized interfaces, some of which are indicated in FIG. 7, such as interfaces S3, S4, S5, etc., although not described herein.

While CN 701 includes many logical nodes, the E-UTRAN access network 702 is formed by at least one node, such as evolved NodeB (base station (BS), eNB or eNodeB) 710, which connects to one or more User Equipment (UE) 711, of which only one is depicted in FIG. 7. UE 711 is also referred to herein as a wireless device (WD) and/or a subscriber station (SS), and can include an M2M-type device. In one exemplary embodiment, UE 711 is capable of utilizing a PRB configuration according to the subject matter disclosed herein. In one exemplary configuration, a single cell of an E-UTRAN access network 702 provides one substantially localized geographical transmission point (having multiple antenna devices) that provides access to one or more UEs. In another exemplary configuration, a single cell of an E-UTRAN access network 702 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 704 by an S1-MME interface and to SGW 706 by an S1-U interface. The protocols that run between the eNBs and the UEs are generally referred to as the "AS protocols." Details of the various interfaces are well known and not described herein.

The eNB 710 hosts the PHYsical (PHY), Medium Access Control (MAC), Radio Link Control (RLC), and Packet Data Control Protocol (PDCP) layers, which are not shown in FIG. 7, and which include the functionality of user-plane header-compression and encryption. The eNB 710 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 710 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 711, generates pages for UEs 711 over the air, broadcasts system information, controls UE measurement reporting, such as the periodicity of Channel Quality Information (CQI) reports, and allocates cell-level temporary identifiers to active UEs 711. The RRC layer also executes transfer of UE context from a source eNB to a target eNB during handover, and provides integrity protection for RRC messages. Additionally, the RRC layer is responsible for the setting up and maintenance of radio bearers.

Figure 8:
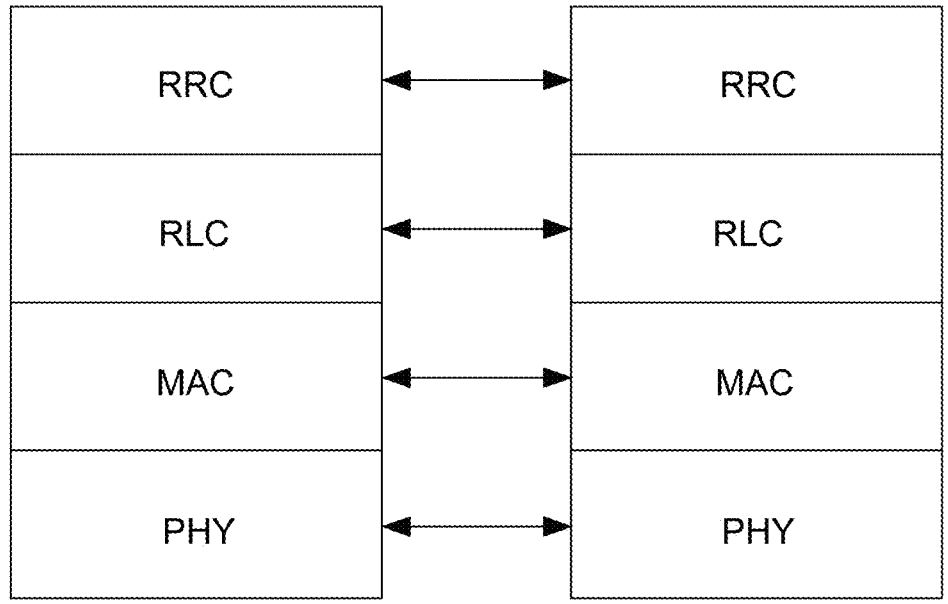
FIGS. 8 and 9 respectively depict exemplary radio interface protocol structures between a UE and an eNodeB that are based on a 3GPP-type radio access network standard and that is capable of utilizing a PRB configuration according to the subject matter disclosed herein.
Figure 9:
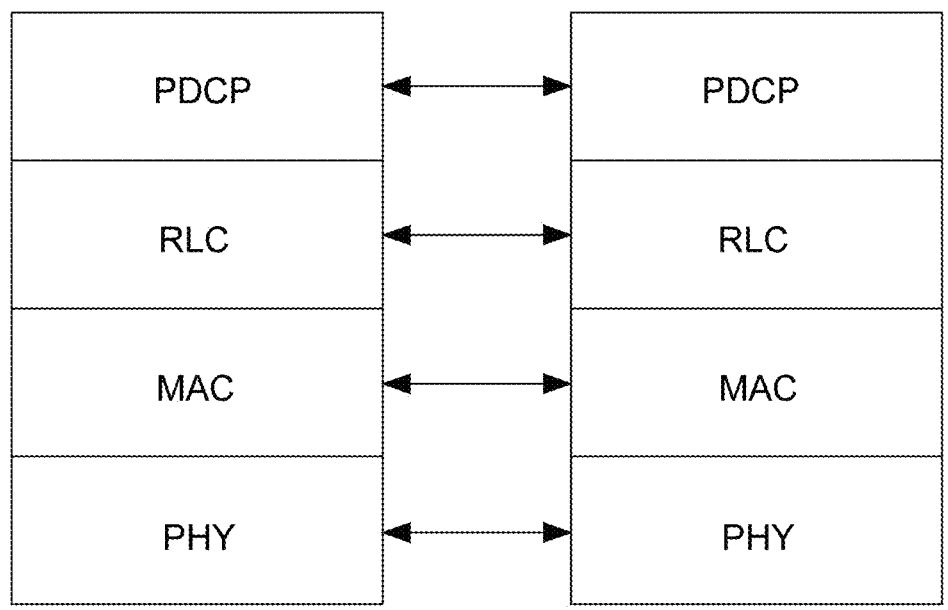

FIGS. 8 and 9 respectively depict exemplary radio interface protocol structures between a UE and an eNodeB that are based on a 3GPP-type radio access network standard and that is capable of utilizing a PRB configuration according to the subject matter disclosed herein. More specifically, FIG. 8 depicts individual layers of a radio protocol control plane and FIG. 9 depicts individual layers of a radio protocol user plane. The protocol layers of FIGS. 6 and 7 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 10:
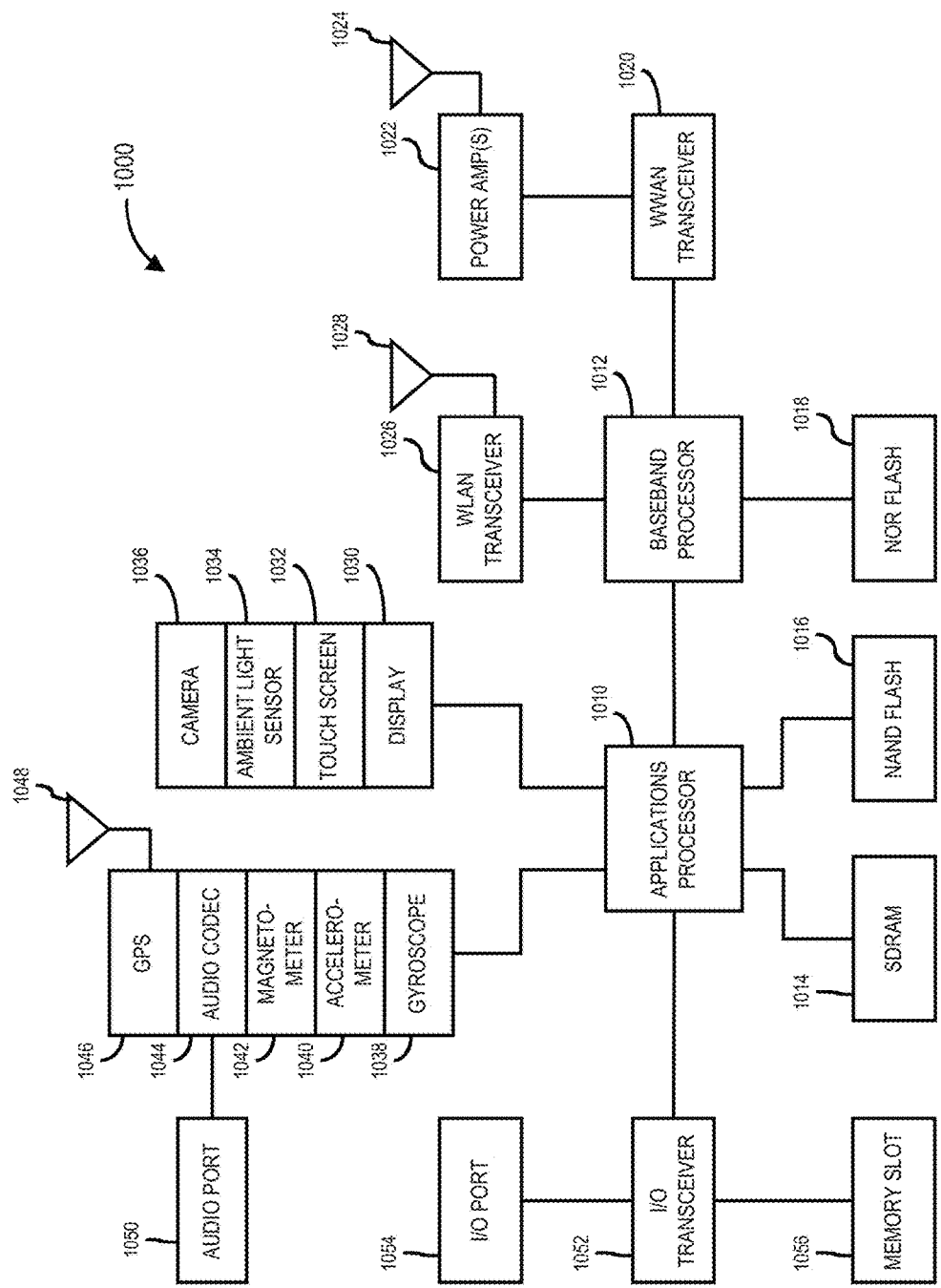
FIG. 10 depicts an exemplary functional block diagram of an information-handling system that is capable of utilizing a PRB configuration according to the subject matter disclosed herein.

FIG. 10 depicts an exemplary functional block diagram of an information-handling system 1000 that is capable of utilizing a PRB configuration according to the subject matter disclosed herein. Information-handling system 1000 of FIG. 10 may tangibly embody one or more of any of the exemplary devices, exemplary network elements and/or functional entities of the network as shown in and described with respect to FIG. 4, FIG. 6, and/or core network 701 as shown in and described with respect to FIG. 7. In one exemplary embodiment, information-handling system 1000 may represent the components of wireless device 400, subscriber station 616, CPE 622, base stations 614 and 620, eNB 710, and/or UE 711, with greater or fewer components depending on the hardware specifications of the particular device or network element. In another exemplary embodiment, information-handling system may provide M2M-type device capability. In yet another exemplary embodiment, information-handling system 1000 is capable of utilizing a PRB configuration according to the subject matter disclosed herein. Although information-handling system 1000 represents one example of several types of computing platforms, information-handling system 1000 may include more or fewer elements and/or different arrangements of elements than shown in FIG. 10, and the scope of the claimed subject matter is not limited in these respects.

In one or more embodiments, information-handling system 1000 may comprise one or more applications processor 1010 and a baseband processor 1012. Applications processor 1010 may be utilized as a general purpose processor to run applications and the various subsystems for information-handling system 1000, and to capable of utilizing a PRB configuration according to the subject matter disclosed herein. Applications processor 1010 may include a single core or alternatively may include multiple processing cores wherein one or more of the cores may comprise a digital signal processor or digital signal processing core. Furthermore, applications processor 1010 may include a graphics processor or coprocessor disposed on the same chip, or alternatively a graphics processor coupled to applications processor 1010 may comprise a separate, discrete graphics chip. Applications processor 1010 may include on-board memory, such as cache memory, and further may be coupled to external memory devices such as synchronous dynamic random access memory (SDRAM) 1014 for storing and/or executing applications, such as capable of utilizing a PRB configuration according to the subject matter disclosed herein. During operation, and NAND flash 1016 for storing applications and/or data even when information-handling system 1000 is powered off.

In one exemplary embodiment, a list of candidate nodes may be stored in SDRAM 1014 and/or NAND flash 1016. Further, applications processor 1010 may execute computer-readable instructions stored in SDRAM 1014 and/or NAND flash 1016 that result in utilizing a PRB configuration according to the subject matter disclosed herein.

In one exemplary embodiment, baseband processor 1012 may control the broadband radio functions for information-handling system 1000. Baseband processor 1012 may store code for controlling such broadband radio functions in a NOR flash 1018. Baseband processor 1012 controls a wireless wide area network (WWAN) transceiver 1020 which is used for modulating and/or demodulating broadband network signals, for example, for communicating via a 3GPP LTE network or the like as discussed herein with respect to FIG. 10. The WWAN transceiver 1020 couples to one or more power amplifiers 1022 that are respectively coupled to one or more antennas 1024 for sending and receiving radio-frequency signals via the WWAN broadband network. The baseband processor 1012 also may control a wireless local area network (WLAN) transceiver 1026 coupled to one or more suitable antennas 1028 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol to wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1010 and baseband processor 1012, and the scope of the claimed subject matter is not limited in these respects. For example, any one or more of SDRAM 1014, NAND flash 1016 and/or NOR flash 1018 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1010 may drive a display 1030 for displaying various information or data, and may further receive touch input from a user via a touch screen 1032, for example, via a finger or a stylus. In one exemplary embodiment, screen 1032 display a menu and/or options to a user that are selectable via a finger and/or a stylus for entering information into information-handling system 1000.

An ambient light sensor 1034 may be utilized to detect an amount of ambient light in which information-handling system 1000 is operating, for example, to control a brightness or contrast value for display 1030 as a function of the intensity of ambient light detected by ambient light sensor 1034. One or more cameras 1036 may be utilized to capture images that are processed by applications processor 1010 and/or at least temporarily stored in NAND flash 1016. Furthermore, applications processor may be coupled to a gyroscope 1038, accelerometer 1040, magnetometer 1042, audio coder/decoder (CODEC) 1044, and/or global positioning system (GPS) controller 1046 coupled to an appropriate GPS antenna 1048, for detection of various environmental properties including location, movement, and/or orientation of information-handling system 1000. Alternatively, controller 1046 may comprise a Global Navigation Satellite System (GNSS) controller. Audio CODEC 1044 may be coupled to one or more audio ports 1050 to provide microphone input and speaker outputs either via internal devices and/or via external devices coupled to information-handling system via the audio ports 1050, for example, via a headphone and microphone jack. In addition, applications processor 1010 may couple to one or more input/output (I/O) transceivers 1052 to couple to one or more I/O ports 1054 such as a universal serial bus (USB) port, a high-definition multimedia interface (HDMI) port, a serial port, and so on. Furthermore, one or more of the I/O transceivers 1052 may couple to one or more memory slots 1056 for optional removable memory, such as secure digital (SD) card or a subscriber identity module (SIM) card, although the scope of the claimed subject matter is not limited in these respects.

Figure 11:
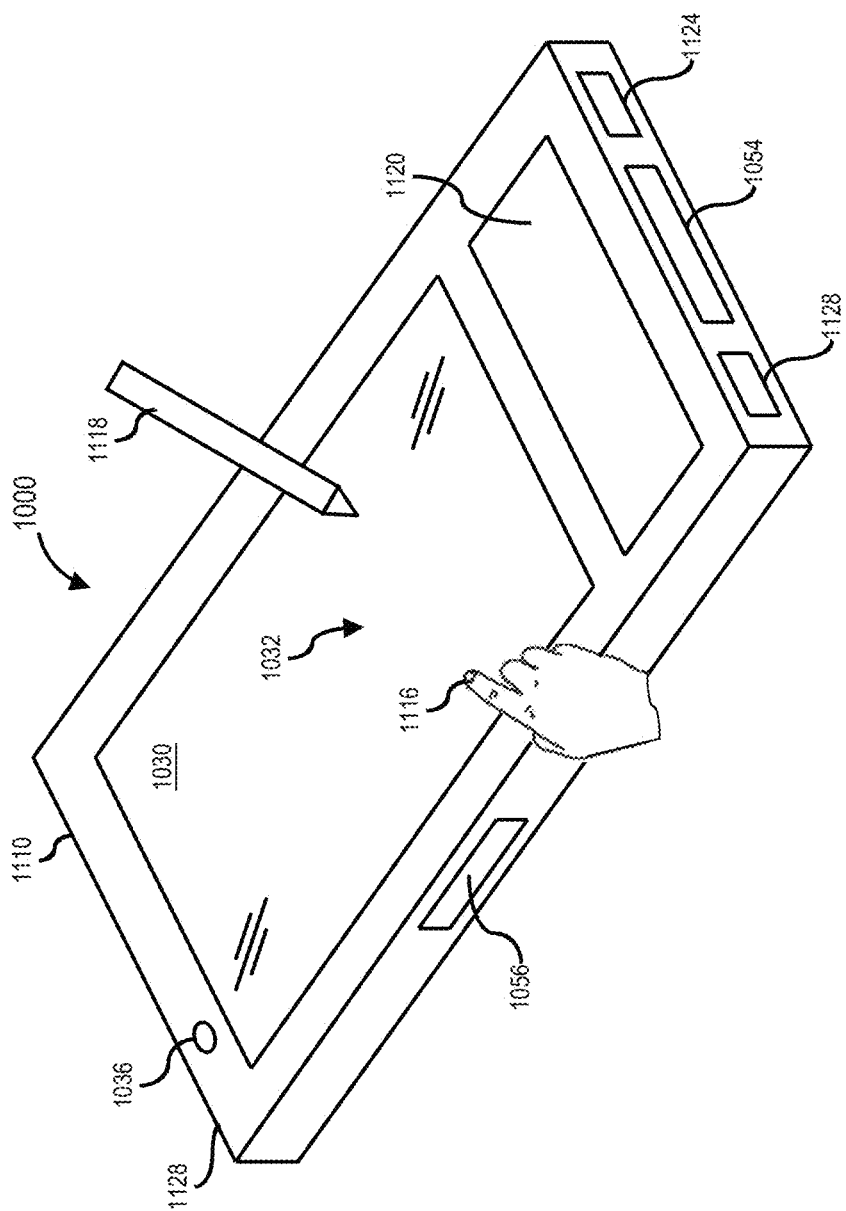
FIG. 11 depicts an isometric view of an exemplary embodiment of the information-handling system of FIG. 10 that optionally may include a touch screen in accordance with one or more embodiments disclosed herein.

FIG. 11 depicts an isometric view of an exemplary embodiment of the information-handling system of FIG. 10 that optionally may include a touch screen in accordance with one or more embodiments disclosed herein. FIG. 11 shows an example implementation of information-handling system 1000 of FIG. 10 tangibly embodied as a cellular telephone, smartphone, smart-type device, or tablet-type device or the like, that is capable of utilizing a PRB configuration according to the subject matter disclosed herein. In one or more embodiments, the information-handling system 1000 may comprise any one of the infrastructure nodes, wireless device 400, subscriber station 616, CPE 622, mobile station UE 711 of FIG. 7, and/or an M2M-type device, although the scope of the claimed subject matter is not limited in this respect. The information-handling system 1000 may comprise a housing 1110 having a display 1030 that may include a touch screen 1032 for receiving tactile input control and commands via a finger 1116 of a user and/or a via stylus 1118 to control one or more applications processors 1010. The housing 1110 may house one or more components of information-handling system 800, for example, one or more applications processors 1010, one or more of SDRAM 1014, NAND flash 1016, NOR flash 1018, baseband processor 1012, and/or WWAN transceiver 1020. The information-handling system 1000 further may optionally include a physical actuator area 1120 which may comprise a keyboard or buttons for controlling information-handling system via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1124 and a connection port 1054 for connecting the information-handling system 1000 to another electronic device, dock, display, battery charger, and so on. Additionally, information-handling system 1000 may include a headphone or speaker jack 1128 and one or more cameras 836 on one or more sides of the housing 1110. It should be noted that the information-handling system 1000 of FIGS. 10 and 11 may include more or fewer elements than shown, in various arrangements, and the scope of the claimed subject matter is not limited in this respect.

Figure 12:
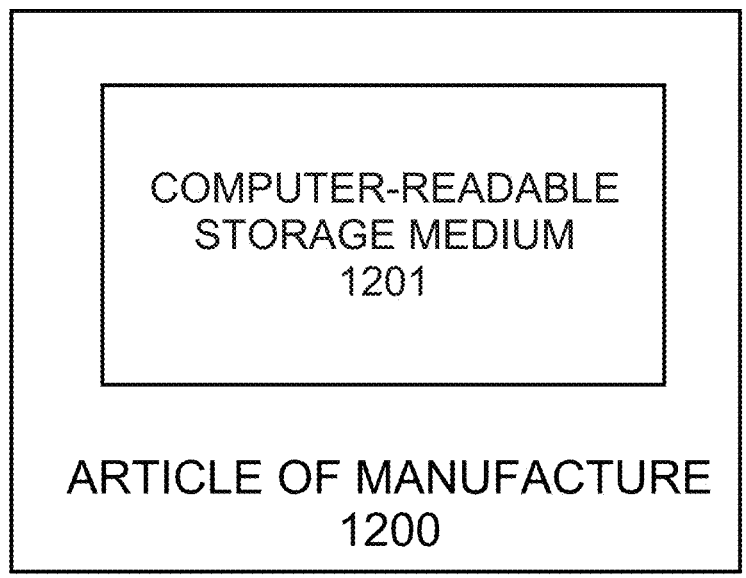
FIG. 12 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 12 depicts an exemplary embodiment of an article of manufacture 1200 comprising a non-transitory computer-readable storage medium 1201 having stored thereon computer-readable instructions that, when executed by a computer-type device, results in any of the various techniques and methods according to the subject matter disclosed herein. Exemplary computer-readable storage mediums that could be used for computer-readable storage medium 1201 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. An apparatus comprising processing circuitry to:
receive a downlink signal from a transmitter, the downlink signal comprising a radio frame having multiple subframes comprising a band of physical resource blocks (PRBs), the PRBs comprising orthogonal frequency division multiplex (OFDM) symbols;
demodulate the received downlink signal using a first demodulation reference signal (DMRS) pattern for a first group of PRBs having a potential for collisions with one or more synchronization signals, wherein the first group of PRBs comprises a center group of six PRBs disposed about a center of system bandwidth; and
demodulate the received downlink signal using a second DMRS pattern for a second group of PRBs without a potential for collisions with one or more synchronization signals, wherein the second group of PRBs comprises a group of PRBs located outside the center group of six PRBs;
wherein the first DMRS pattern is arranged to avoid collision between a reference signal and a synchronization signal; and
wherein the first DMRS pattern for the first group of PRBs comprises UE reference signals on OFDM symbols 0-1 and 7-8 for one or more PRBs of the first group of PRBs, and wherein the first DMRS pattern is used as the second DMRS pattern for the second group of PRBs in one or more subframes.

2. An apparatus as claimed in claim 1, wherein first DMRS pattern and the second DMRS pattern are applied in PRBs of subframe 0 and subframe 5 of the radio frame.

3. An apparatus as claimed in claim 1, wherein the first group of PRBs are centered about the center of the band, and the second group of PRBs are disposed at a lower end and an upper and of the band.

4. An apparatus as claimed in claim 1, wherein the first DMRS pattern comprises UE reference signals on OFDM symbols 2-3 and 12-13 for one or more PRBs of the first group of PRBs.

5. An apparatus as claimed in claim 1, wherein the first DMRS pattern comprises UE reference signals on OFDM symbols 1-2 and 12-13 for one or more PRBs of the first group of PRBs.

6. An apparatus as claimed in claim 1, wherein the first DMRS pattern comprises UE reference signals on OFDM symbols 0-1 and 12-13 for one or more PRBs of the first group of PRBs, wherein resource elements for cell specific reference signal (CRS) port 0 are not present for any collision resource elements.

7. An apparatus as claimed in claim 1, wherein the first DMRS pattern comprises UE reference signals on OFDM symbols 5-6 in an even slot, and OFDM symbols 2-3 in an odd slot, for one or more PRBs of the first group of PRBs.

8. An apparatus as claimed in claim 1, wherein the first DMRS pattern comprises UE reference signals on OFDM symbols 5-6 in an even slot, and OFDM symbols 4-5 in an odd slot, for one or more PRBs of the first group of PRBs.

9. An apparatus as claimed in claim 1, wherein the processing circuitry is disposed in a user equipment (UE).

10. An apparatus as claimed in claim 1, further comprising a touch screen to control an input of the apparatus.

11. An article of manufacture comprising a non-transitory medium having stored thereon instructions that, if executed, result in:
receiving a downlink signal from a transmitter, the downlink signal comprising a radio frame having multiple subframes comprising a band of physical resource blocks (PRBs), the PRBs comprising orthogonal frequency division multiplex (OFDM) symbols;

demodulating the received downlink signal using a first demodulation reference signal (DMRS) pattern for a first group of PRBs having a potential for collisions with one or more synchronization signals, wherein the first group of PRBs comprises a center group of six PRBs disposed about a center of system bandwidth; and demodulating the received downlink signal using a second DMRS pattern for a second group of PRBs without a potential for collisions with one or more synchronization signals wherein the second group of PRBs comprises a group of PRBs located outside the center group of six PRBs;

wherein the first DMRS pattern is arranged to avoid collision between a reference signal of the transceiver and a synchronization signal; and wherein the first DMRS pattern for the first group of PRBs comprises UE reference signals on OFDM symbols 0-1 and 7-8 for one or more PRBs of the first group of PRBs, and wherein the first DMRS pattern is used as the second DMRS pattern for the second group of PRBs in one or more subframes.

12. An article of manufacture as claimed in claim 11, wherein first DMRS pattern and the second DMRS pattern are applied in PRBs of subframe 0 and subframe 5 of the radio frame.

13. An article of manufacture as claimed in claim 11, wherein the first group of PRBs are centered about the center of the band, and the second group of PRBs are disposed at a lower end and an upper and of the band.

14. An article of manufacture as claimed in claim 11, wherein the first DMRS pattern comprises UE reference signals on OFDM symbols 2-3 and 12-13 for one or more PRRBs of the first group of PRBs.

15. An article of manufacture as claimed in claim 11, wherein the first DMRS pattern comprises UE reference signals on OFDM symbols 1-2 and 12-13 for one or more PRBs of the first group of PRBs.

16. An article of manufacture as claimed in claim 11, wherein the first DMRS pattern comprises UE reference signals on OFDM symbols 0-1 and 12-13 for one or more PRBs of the first group of PRBs, wherein resource elements for cell specific reference signal (CRS) port 0 are not present for any collision resource elements.

17. An article of manufacture as claimed in claim 11, wherein the first DMRS pattern comprises UE reference signals on OFDM symbols 5-6 in an even slot, and OFDM symbols 2-3 in an odd slot, for one or more PRBs of the first group of PRBs.

18. An article of manufacture as claimed in claim 11, wherein the first DMRS pattern comprises UE reference signals on OFDM symbols 5-6 in an even slot, and OFDM symbols 4-5 in an odd slot, for one or more PRBs of the first group of PRBs.

* * * * *